US009719871B2

(12) United States Patent
Blum et al.

(10) Patent No.: US 9,719,871 B2
(45) Date of Patent: Aug. 1, 2017

(54) DETECTING A STATE OF A WEARABLE DEVICE

(71) Applicant: Google Inc., Mountain View, CA (US)

(72) Inventors: Jeremy Evan Blum, San Francisco, CA (US); Joseph John Hebenstreit, San Francisco, CA (US); Ali-Reza Bahmandar, Issaquah, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/570,547

(22) Filed: Dec. 15, 2014

(65) Prior Publication Data

US 2016/0041048 A1 Feb. 11, 2016

Related U.S. Application Data

(60) Provisional application No. 62/035,394, filed on Aug. 9, 2014.

(51) Int. Cl.
| | | |
|---|---|---|
| *G01B 7/16* | (2006.01) | |
| *G01L 1/00* | (2006.01) | |
| *G01L 1/22* | (2006.01) | |
| *G06F 1/16* | (2006.01) | |
| *G01C 21/10* | (2006.01) | |

(52) U.S. Cl.
CPC ............ *G01L 1/2206* (2013.01); *G01C 21/10* (2013.01); *G06F 1/163* (2013.01)

(58) Field of Classification Search
CPC ..... G01L 1/2206; G06F 1/3206; G06F 1/163; G02B 2027/0178
USPC ........................................................ 73/774
See application file for complete search history.

(56) References Cited

U.S. PATENT DOCUMENTS

| | | | |
|---|---|---|---|
| 5,777,235 A * | 7/1998 | Altwein .................. | G01D 3/028 73/763 |
| 7,315,254 B2 | 1/2008 | Smith et al. | |
| 7,532,196 B2 | 5/2009 | Hinckley | |
| 7,849,752 B2 | 12/2010 | Gregory et al. | |
| 7,952,038 B1 * | 5/2011 | Ando ..................... | H01H 13/48 200/1 B |
| 8,199,126 B1 * | 6/2012 | Taubman ................ | G06F 3/011 345/156 |
| 8,223,024 B1 * | 7/2012 | Petrou .................. | G02B 27/017 340/539.13 |

(Continued)

OTHER PUBLICATIONS

International Search Report and Written Opinion issued in connection with International Patent Application No. PCT/US2015/034412 on Aug. 21, 2015, 13 pages.

*Primary Examiner* — Lisa Caputo
*Assistant Examiner* — Roger Hernandez-Prewitt
(74) *Attorney, Agent, or Firm* — McDonnell Boehnen Hulbert & Berghoff LLP

(57) ABSTRACT

An example method includes detecting a signal that represents a strain of a frame of a wearable computing device and causing the wearable computing device to perform a function based on the detected signal. The method may also include generating a representation of the detected signal, comparing the representation of the signal to a threshold value, and causing the wearable computing device to perform a function based on the comparison to the threshold value. An example wearable computing device and an example non-transitory computer readable medium related to the example method are also disclosed herein.

20 Claims, 16 Drawing Sheets

(56) References Cited

U.S. PATENT DOCUMENTS

| | | |
|---|---|---|
| 8,323,216 B2 | 12/2012 | Fabian |
| 8,346,302 B2 | 1/2013 | Alameh et al. |
| 8,351,773 B2 | 1/2013 | Nasiri et al. |
| 2008/0216171 A1 | 9/2008 | Sano et al. |
| 2010/0110368 A1* | 5/2010 | Chaum ................ G02B 27/017 351/158 |
| 2011/0026722 A1* | 2/2011 | Jing .................... G10L 21/0208 381/71.1 |
| 2011/0267321 A1* | 11/2011 | Hayakawa ......... G02B 27/0093 345/204 |
| 2012/0206322 A1 | 8/2012 | Osterhout et al. |
| 2013/0154906 A1 | 6/2013 | Braun et al. |
| 2013/0162683 A1* | 6/2013 | Paretti ....................... G06T 3/60 345/650 |
| 2013/0169513 A1* | 7/2013 | Heinrich .............. G02B 27/017 345/8 |
| 2014/0125618 A1 | 5/2014 | Panther et al. |
| 2014/0143785 A1 | 5/2014 | Mistry et al. |
| 2014/0194782 A1 | 7/2014 | Rahman et al. |

\* cited by examiner

DETECTING A STATE OF A WEARABLE DEVICE

CROSS REFERENCE TO RELATED APPLICATION

The present disclosure claims priority to U.S. Provisional Patent Application No. 62/035,394, filed on Aug. 9, 2014, the entire contents of which are herein incorporated by reference.

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real time with an augmented or virtual reality. Such applications can be mission-critical or safety-critical, such as in a public safety or aviation setting. The applications can also be recreational, such as interactive gaming. Many other applications are also possible.

SUMMARY

A wearable computing device may include one or more strain gauges configured to detect strains within a frame of the wearable computing device corresponding to (i) when the wearable computing device is being worn and (ii) when the wearable computing device is not being worn. The wearable computing device may be configured to (i) enter a low-power state based on the wearable computing device detecting that the wearable computing device is not being worn and to (ii) enter a high-power state based on the wearable computing device detecting that the wearable computing device is being worn. By controlling an amount of power the wearable computing device consumes based on whether the wearable computing device is being worn, the wearable computing device may avoid wasting energy, thereby conserving the battery life of the wearable computing device.

For example, in a configuration mode, the wearable computing device may receive an input indicating that the wearable computing device is being worn and the wearable computing device may correlate a first detected strain (or range of strains) of the frame with the wearable computing device being worn. Similarly in a situation where the wearable computing device is not being worn, the wearable computing device may correlate a second strain value (or range of strains) with the wearable computing device not being worn. The wearable computing device may also detect strain data using the one or more strain gauges and compare the data with sensory data collected by other sensors of the wearable computing device, such as an accelerometer or a gyroscope, in order to increase a confidence level corresponding to whether the wearable computing device is being worn.

In a first example a wearable computing device is provided. The wearable computing device includes a frame, a processor, a strain gauge affixed to the frame, and a computer readable medium storing instructions that when executed by the processor cause the wearable computing device to perform functions. The functions comprise detecting a signal provided by the strain gauge that represents a strain of the frame, and causing the wearable computing device to perform a function based on the detected signal.

In a second example, a method is provided. The method includes detecting a signal that represents a strain of a frame of a wearable computing device and causing the wearable computing device to perform a function based on the detected signal.

In a third example, a non-transitory computer readable medium is provided. The computer readable medium stores instructions that when executed by a wearable computing device cause the wearable computing device to perform functions. The functions include detecting a signal that represents a strain of a frame of the wearable computing device and causing the wearable computing device to perform a function based on the detected signal.

In a fourth example, a system is provided that includes means for detecting a signal that represents a strain of a frame of a wearable computing device and means for causing the wearable computing device to perform a function based on the detected signal.

These as well as other aspects, advantages, and alternatives will become apparent to those of ordinary skill in the art by reading the following detailed description, with reference where appropriate to the accompanying drawings.

DETAILED DESCRIPTION

Figure 1A:
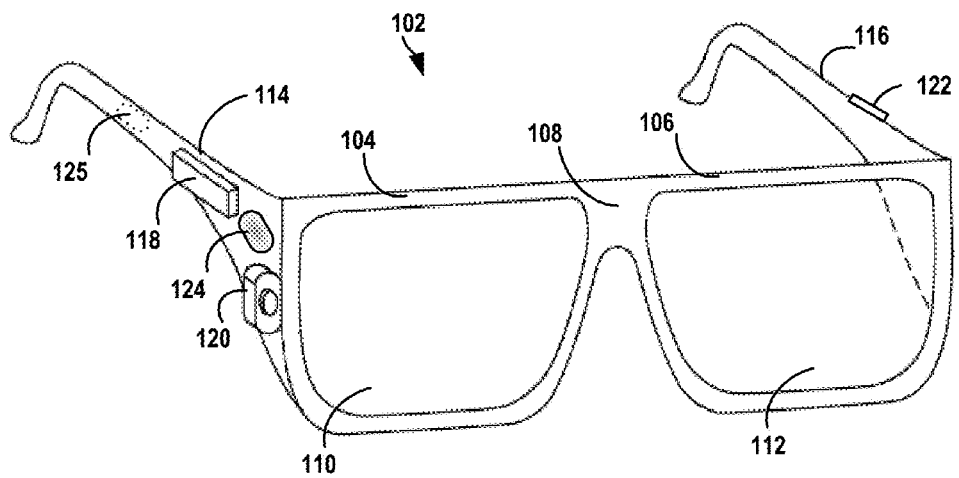
FIG. 1A illustrates a wearable computing system according to an example embodiment.

Example methods and systems are described herein. It should be understood that the words "example," "exemplary," and "illustrative" are used herein to mean "serving as an example, instance, or illustration" Any embodiment or feature described herein as being an "example," being "exemplary," or being "Illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

A wearable computing device may be used in many ways, some of which include providing visual or audio notifications about surroundings, or receiving email, text messages, or other notifications in a heads-up display of the wearable computing device. In many instances, it is desirable for the wearable computing device to have a small and/or lightweight design so that the wearable computing device is comfortable to wear, and/or so that interference with everyday activities is minimized. Further, many components and functions of the wearable computing device require power from a power source such as a battery, which is typically housed in the wearable computing device. Thus, a battery with a larger capacity (e.g., that can store more energy and provide more power) is typically desirable. However, increasing the capacity of a battery often increases the size and/or weight of the battery, which is often undesirable from ergonomic and/or aesthetic perspectives. Therefore, comfort in wearing the wearable computing device may be in conflict with the increased battery life for the wearable computing device. Accordingly, example embodiments described herein may help to extend battery life of a battery having a given capacity.

For example, a head-mountable device (HMD) may include one or more strain gauges affixed to a frame of the HMD. In one example, the frame of the HMD may be configured to strain and apply a gentle grasping force to a user's head as the HMD is worn. This may cause the one or more strain gauges to detect the strain of the frame, indicating that the HMD has been placed upon the user's head. Likewise, when the HMD is removed from the user's head, the frame may recoil and the strain gauge(s) may detect another strain (or absence of strain) that indicates that the user is no longer wearing the HMD. In many cases, when the HMD is not being worn it will be unnecessary for the HMD to perform many functions, such as receiving phone calls or displaying notifications. Therefore, when the HMD determines that the HMD is not being worn, the MID may enter a low-power state to extend battery life.

To determine whether the HMD is being worn, the HMD may determine a reference value of strain that corresponds to the HMD being worn and then determine a first threshold value of strain that is greater than the reference value. The reference value may represent an amount of steady-state strain that occurs while the HMD is being worn (or not being worn). For instance, if the HMD is in a low-power state corresponding to the HMD not being worn, and the HMD subsequently detects a strain greater than or equal to the first threshold value (indicating that the HMD is now being worn), the HMD may transition from the low-power state to a high-power state consistent with various functions of the HMD. Since the first threshold value is greater than the reference value, a confidence value pertaining to the HMD actually being worn may be higher when the state transition occurs in response to detecting a strain greater than or equal to the first threshold value as opposed to transitioning when a strain greater than or equal to the reference value but less than the first threshold value is detected.

The HMD may also determine a second threshold value of strain that is less than the reference value. For instance, if the HMD is in a high-power state corresponding to the HMD being worn, and the HMD subsequently detects a strain less than or equal to the second threshold value (indicating that the HMD is now not being worn), the HMD may transition from the high-power state to the low-power state consistent with reduced functionality of the HMD. Since the second threshold value is less than the reference value, a confidence value pertaining to the HMD actually not being worn will be higher when the state transition occurs in response to detecting a strain less than or equal to the second threshold value as opposed to transitioning when a strain less than or equal to the reference value but greater than the second threshold value is detected.

A confidence level of determining whether the HMD is being worn may also be increased by taking into account other sensory data collected by the HMD, such as sensory data received by an accelerometer, a gyroscope, a capacitive sensor, or an eye sensor of the HMD. Also, the confidence level could be increased by averaging several strain gauge measurements taken at different times (e.g., a rolling average) and comparing the average strain to a threshold value, or by otherwise minimizing an effect that outlier strain measurements may have on determining whether the HMD is being worn. For example, a low-pass filter may be used to minimize the effect that outlier strain measurements may have on determining whether the HMD is being worn. Further, the HMD could use two (or more) strain gauges (perhaps respectively located in front of and behind the user's ear), requiring that both detected strains are appropriately greater than or less than respective threshold values pertaining to the two strain gauges before causing a state transition. This may reduce the likelihood of causing a state transition based on misleading strain data.

II. EXAMPLE WEARABLE COMPUTING DEVICES

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more image sensors, one or more infrared sensors, and/or one or more microphones. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a suffice acoustic wave process, among other possibilities. The finger-operable touch pad 124 may be capable of sensing movement of one or more fingers simultaneously, in addition to sensing movement in a direction parallel or planar to the pad surface, in a direction normal to the pad suffice, or both, and may also be capable of sensing a level of pressure applied to the touch pad suffice. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
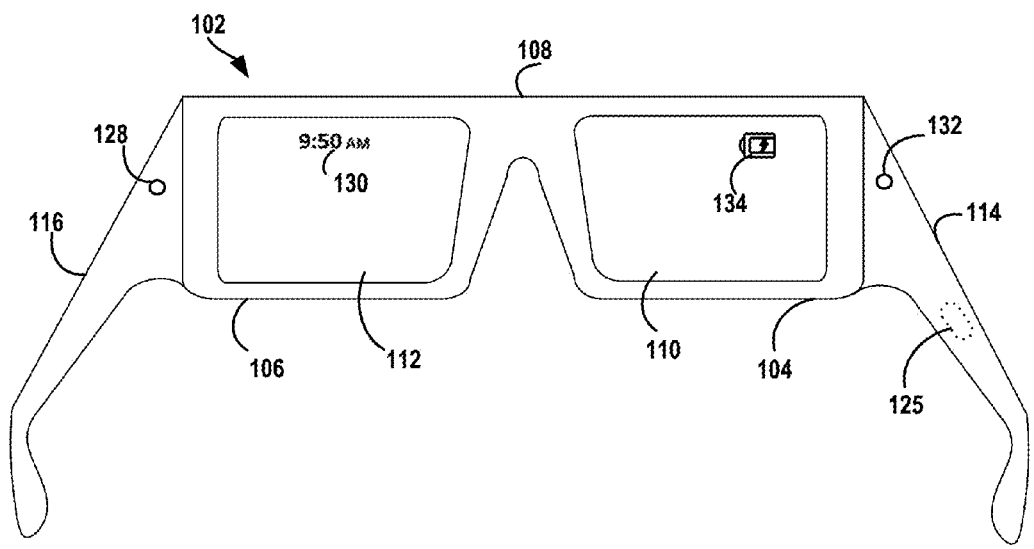
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
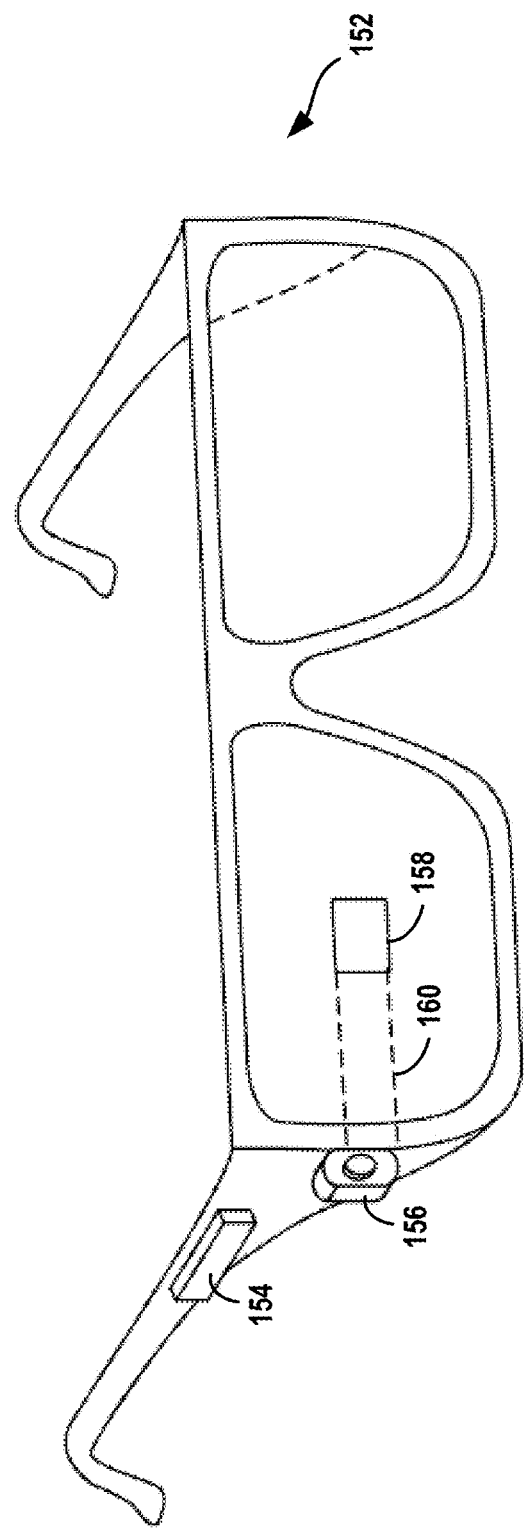
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well, or may be embedded into or otherwise attached to the frame.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
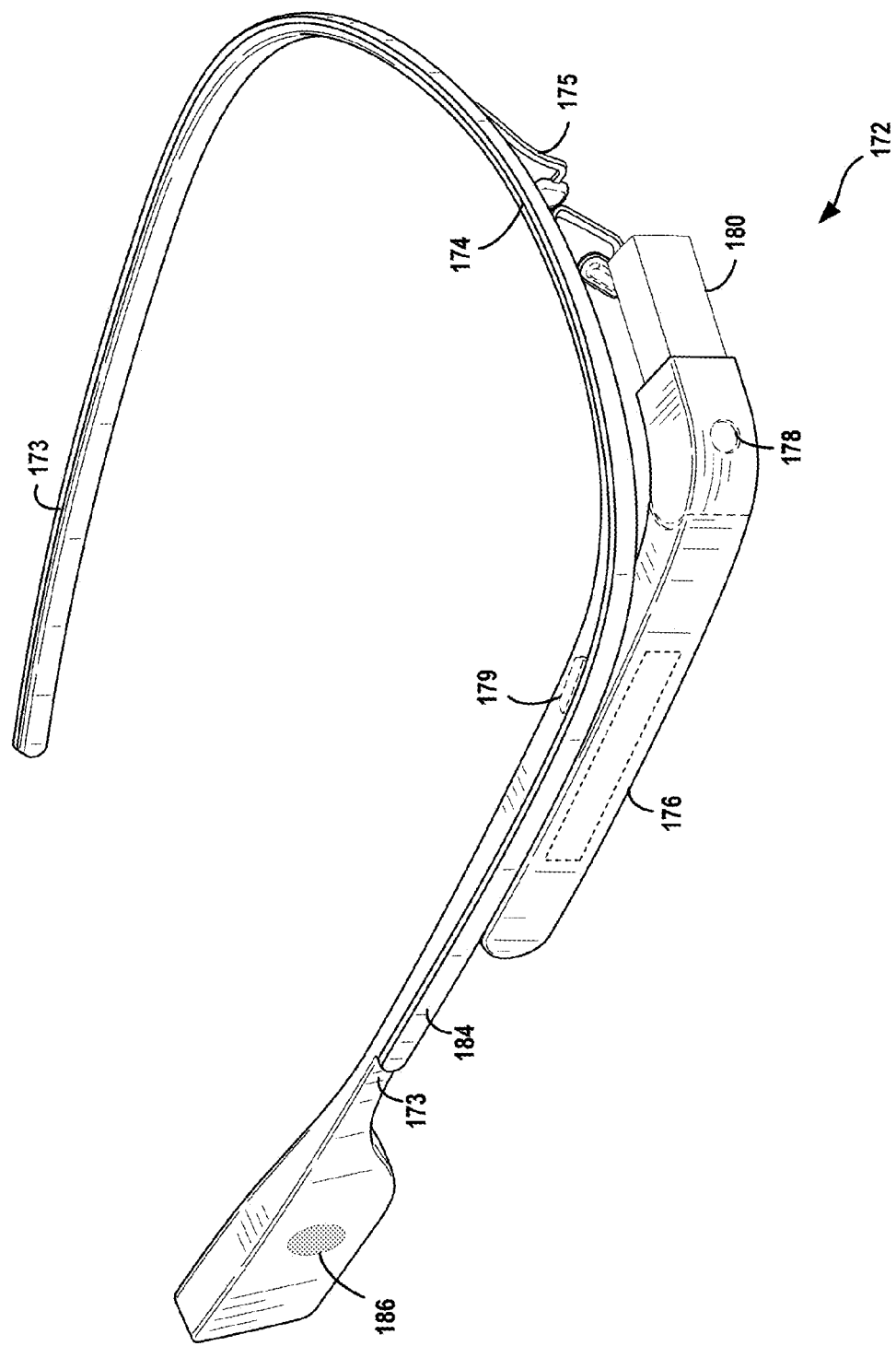
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
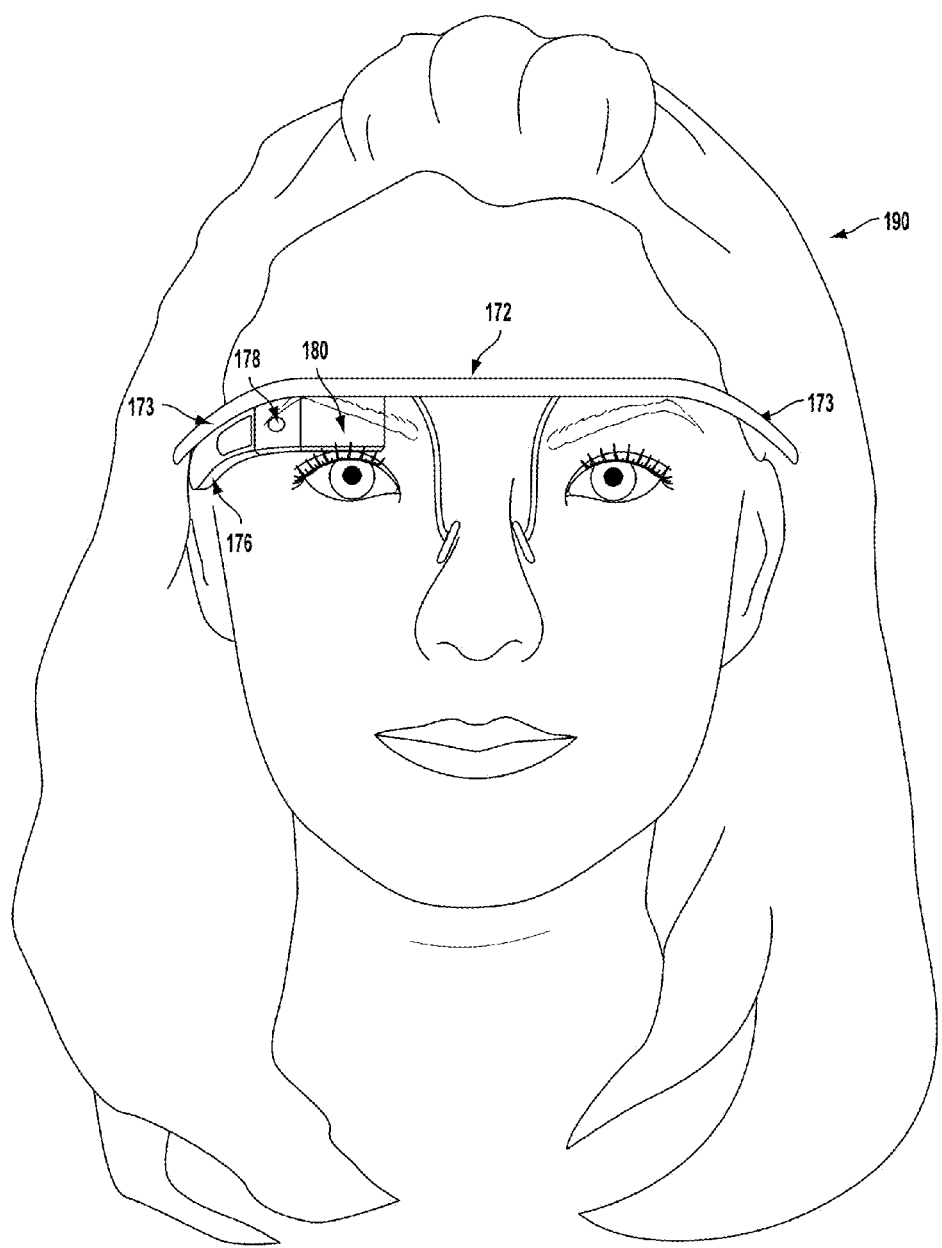
FIGS. 1E, 1F, and 1G are simplified illustrations of the wearable computing system shown in FIG. 1D, being worn by a wearer.
Figure 1F:
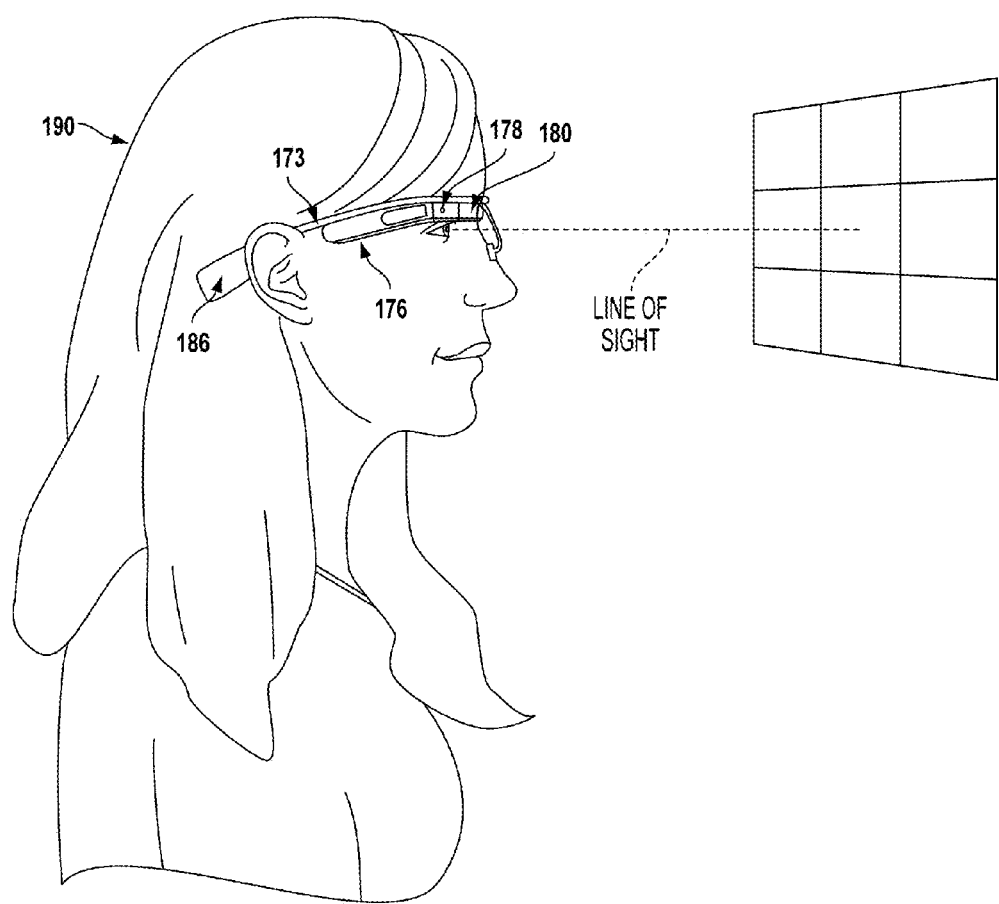
Figure 1G:
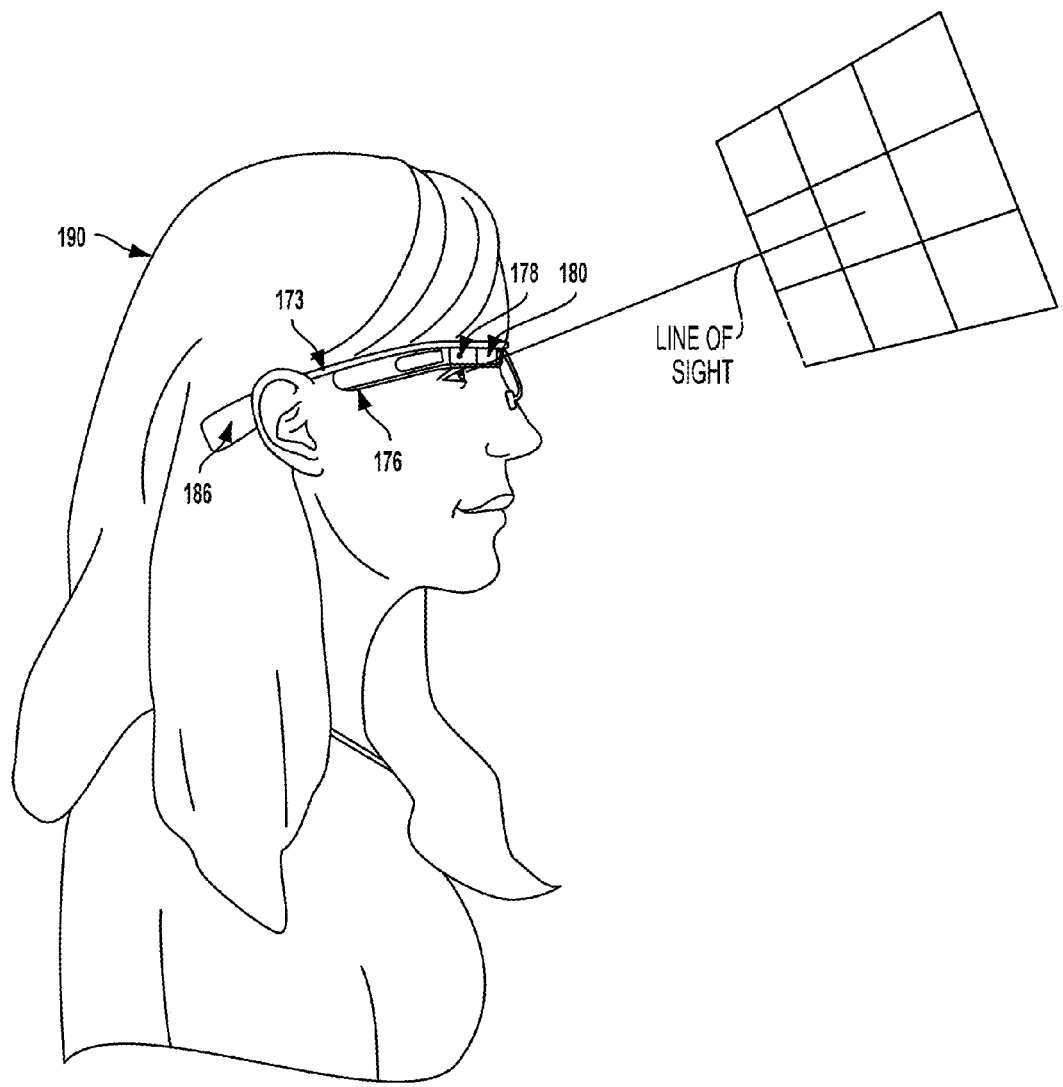

FIGS. 1E to 1G are simplified illustrations of the HMD 172 shown in FIG. 1D, being worn by a wearer 190. As shown in FIG. 1F, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2:
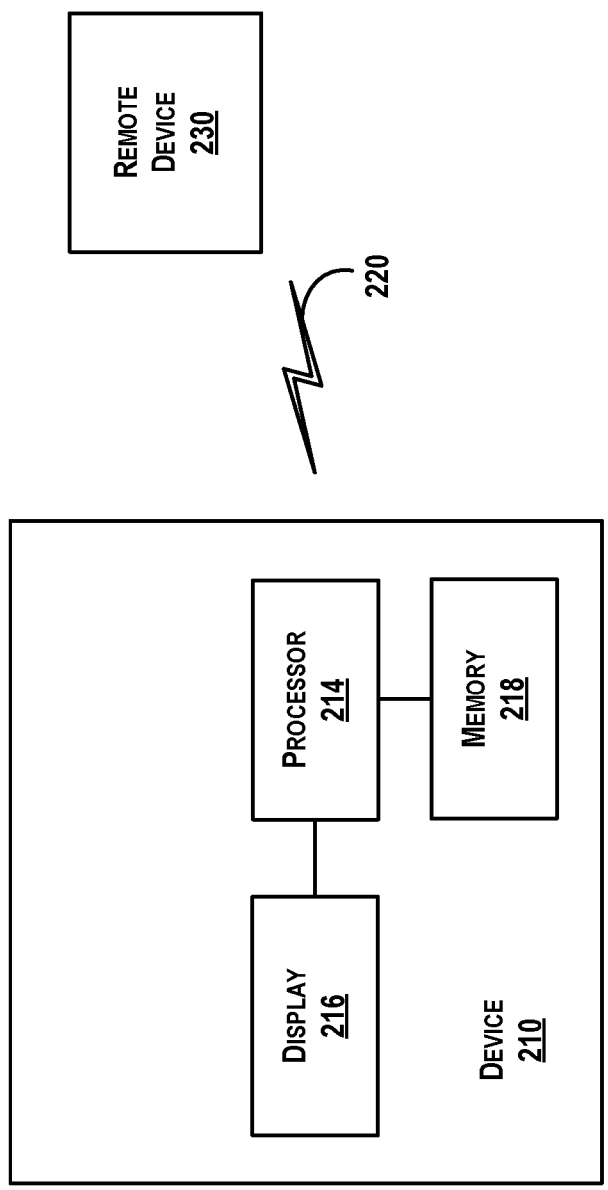
FIG. 2 is a simplified block diagram of a computing device according to an example embodiment.

FIG. 2 is a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may take the form of or include a head-mountable display, such as the head-mounted devices 102, 152, or 172 that are described with reference to FIGS. 1A to 1G.

The device 210 may include a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, head-mountable display, tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of a client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing.

In FIG. 2, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

III. EXAMPLE METHODS AND SYSTEMS

Figure 3:
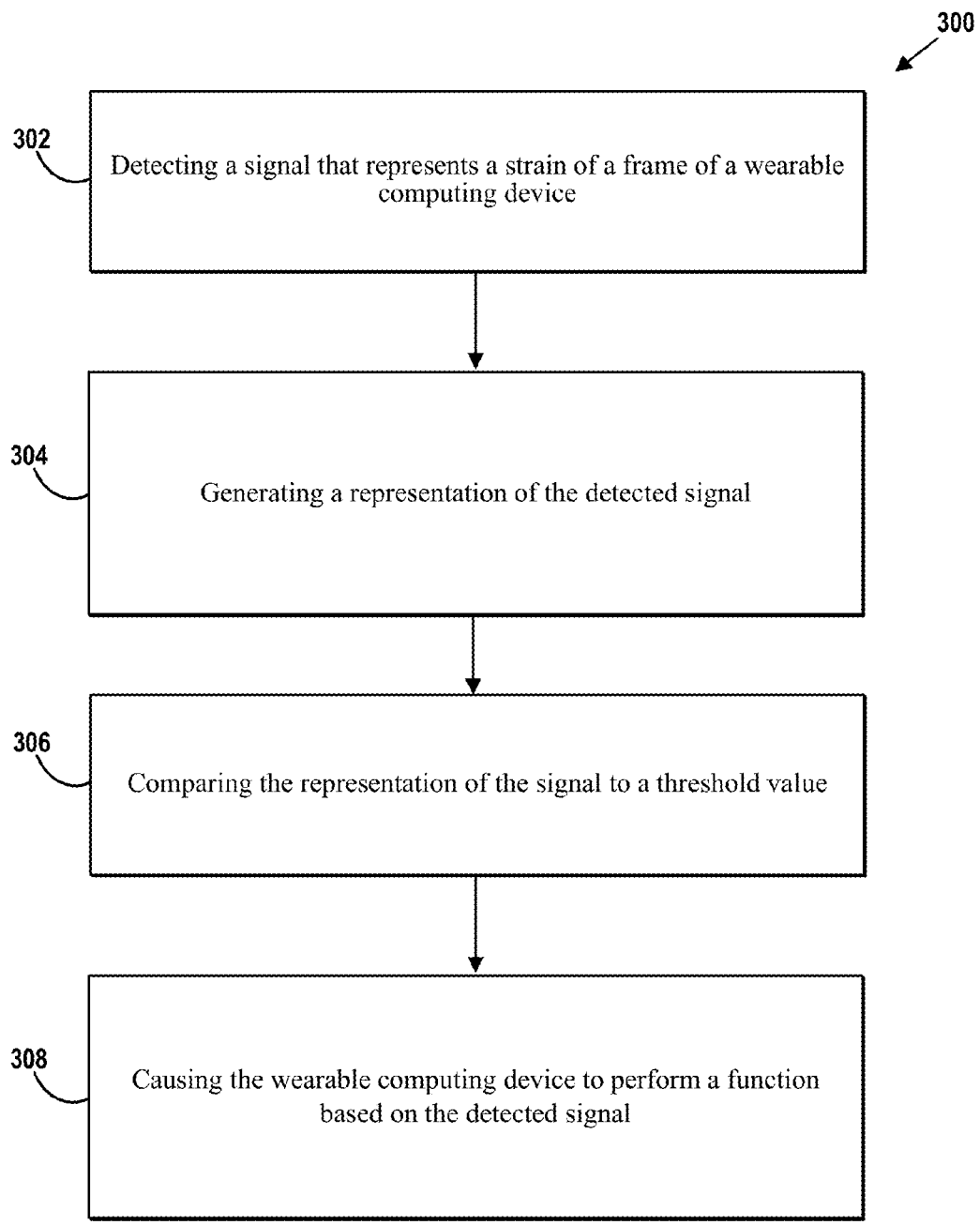
FIG. 3 is a block diagram of an example method.

FIG. 3 is a block diagram depicting an example method, in accordance with at least some embodiments described herein.

At block 302, the method 300 includes detecting a signal that represents a strain of a frame of a wearable computing device. The signal may be detected as a voltage signal or a current signal. The signal may be generated, at least in part, by a strain gauge affixed to the frame of the wearable computing device. A strain gauge may include any device, sensor, or hardware component configured to generate a signal that is dependent upon deformation of the frame. See example locations 402-422 on or within the frame of a head-mounted device (HMD) depicted in FIGS. 4A and 4B. The frame of the HMD could include other forms or shapes than those depicted in FIGS. 4A and 4B.

Figure 7A:
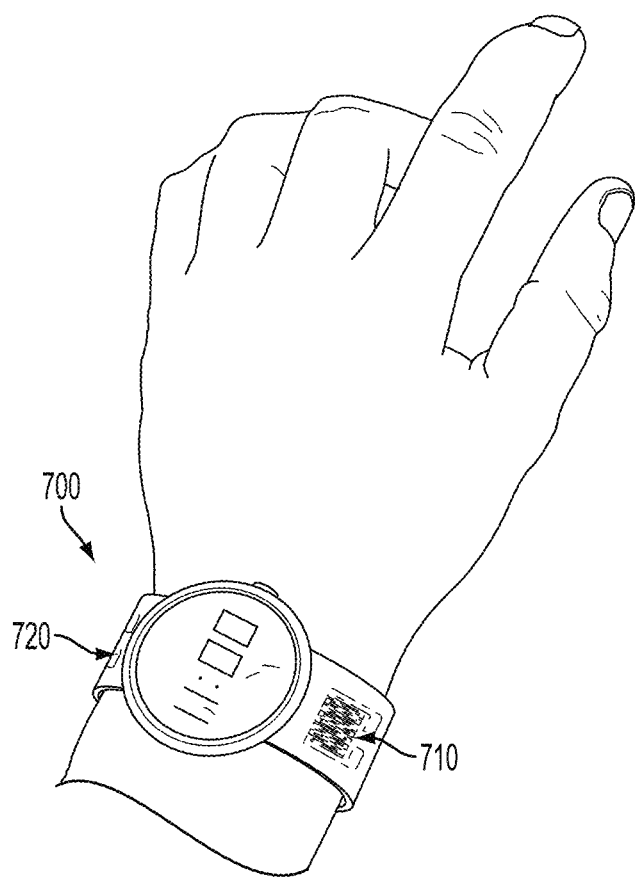
FIG. 7A illustrates example positions of strain gauges of a wearable computing device.

In an example illustrated in FIG. 7A, the wearable computing device may include a wristwatch 700 (e.g., a "smart watch" configured for wireless communication with other computing devices). For instance, strain gauges 710 and 720 may be respectively located on opposite sides of the wristwatch 700, but other positions for the strain gauges 710 and 720 are possible. As shown in FIG. 7A, the strain gauges 710 and 720 may be included within or on a band of the wristwatch 700. The wristwatch 700 may detect one or more signals, representing a strain of the strain gauges 710 or 720, that may be associated with the wristwatch 700 being worn or not being worn.

Figure 7B:
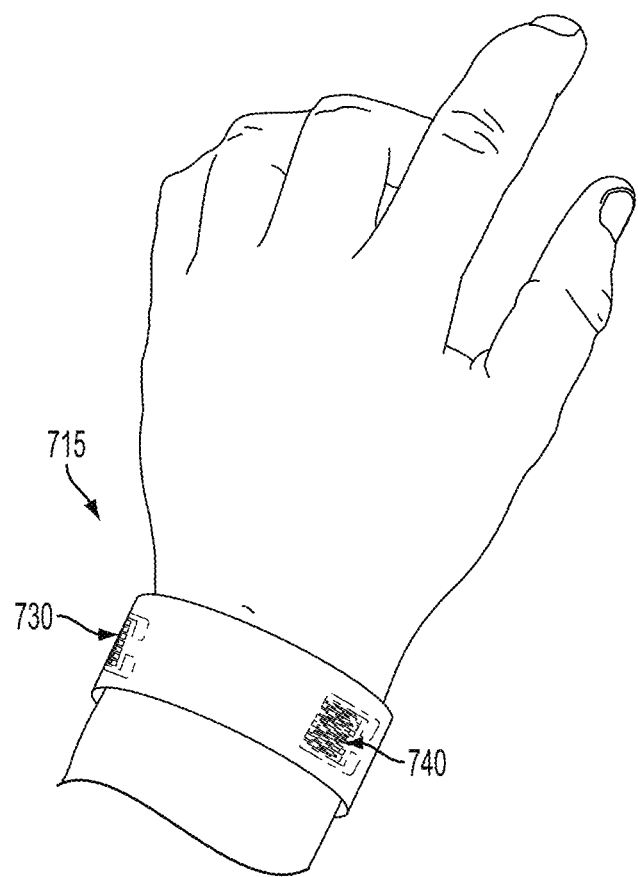
FIG. 7B illustrates example positions of strain gauges of a wearable computing device.

In an example illustrated in FIG. 7B, the wearable computing device may include a bracelet 715. In some examples, the bracelet 715 may include one or more sensors configured to monitor blood pressure, pulse, body temperature, etc. of a wearer and wirelessly send data representative of such information to another computing device. Other functions of the bracelet 715 are possible. For instance, strain gauges 730 and 740 may be respectively located on opposite sides of the bracelet 715, but other positions for the strain gauges 730 and 740 are possible. The bracelet 715 may detect one or more signals, representing a strain of the strain gauges 730 and 740, that may be associated with the bracelet 715 being worn or not being worn.

Figure 7C:
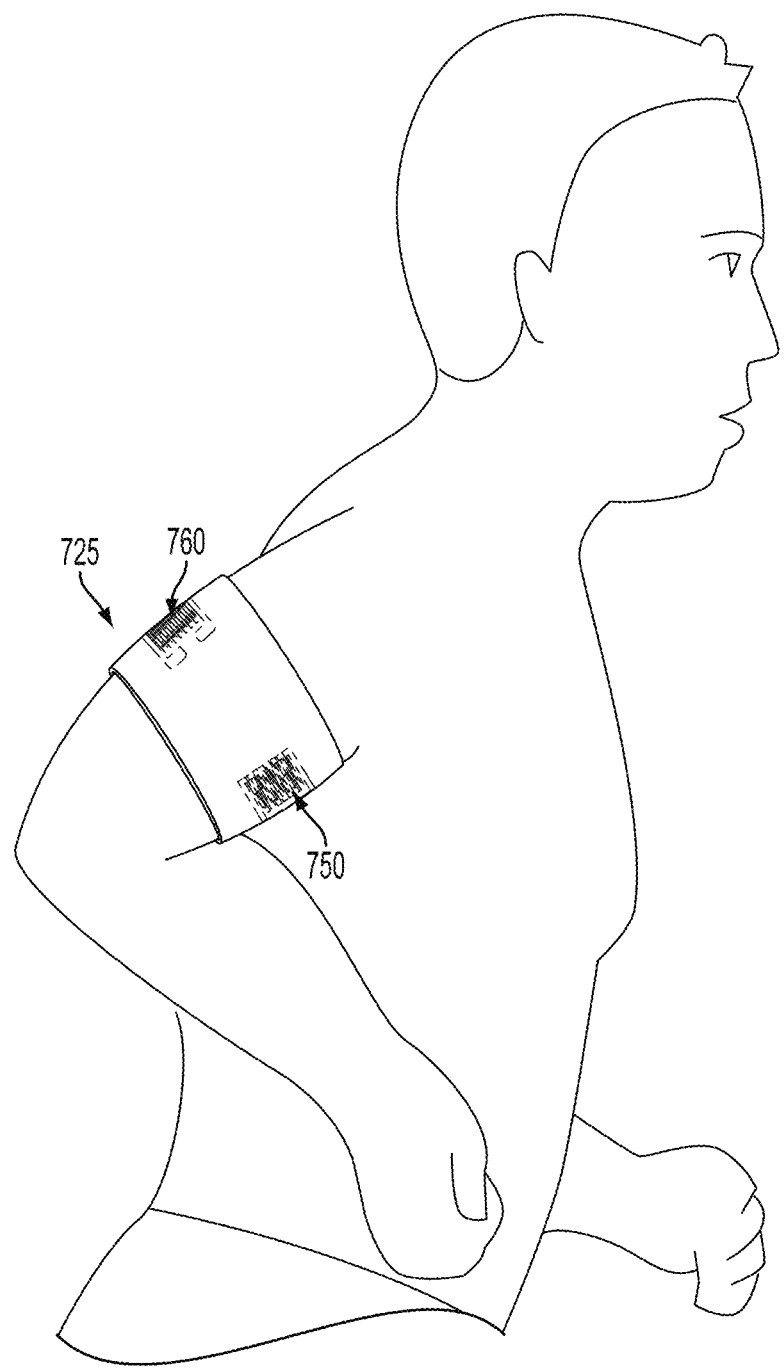
FIG. 7C illustrates example positions of strain gauges of a wearable computing device.

In an example illustrated in FIG. 7C, the wearable computing device may include an armband 725. In some examples, the armband 725 may include one or more sensors configured to monitor blood pressure, pulse, body temperature, etc. of a wearer and wirelessly send data representative of such information to another computing device. Other functions of the armband 725 are possible. For instance, strain gauges 750 and 760 may be respectively located on opposite sides of the armband 725, but other positions for the strain gauges 750 and 760 are possible. The armband 725 may detect one or more signals, representing a strain of the strain gauges 750 and 760, that may be associated with the armband 725 being worn or not being worn. Other examples of wearable computing devices are also possible.

In any of the above examples, the signal may be detected by (e.g., provided to) an analog-to-digital converter, a microcontroller, a processor, a signal amplifier, or any other circuit of the wearable computing device configured to process or compare analog and/or digital signals representing voltage or current.

Figure 5:
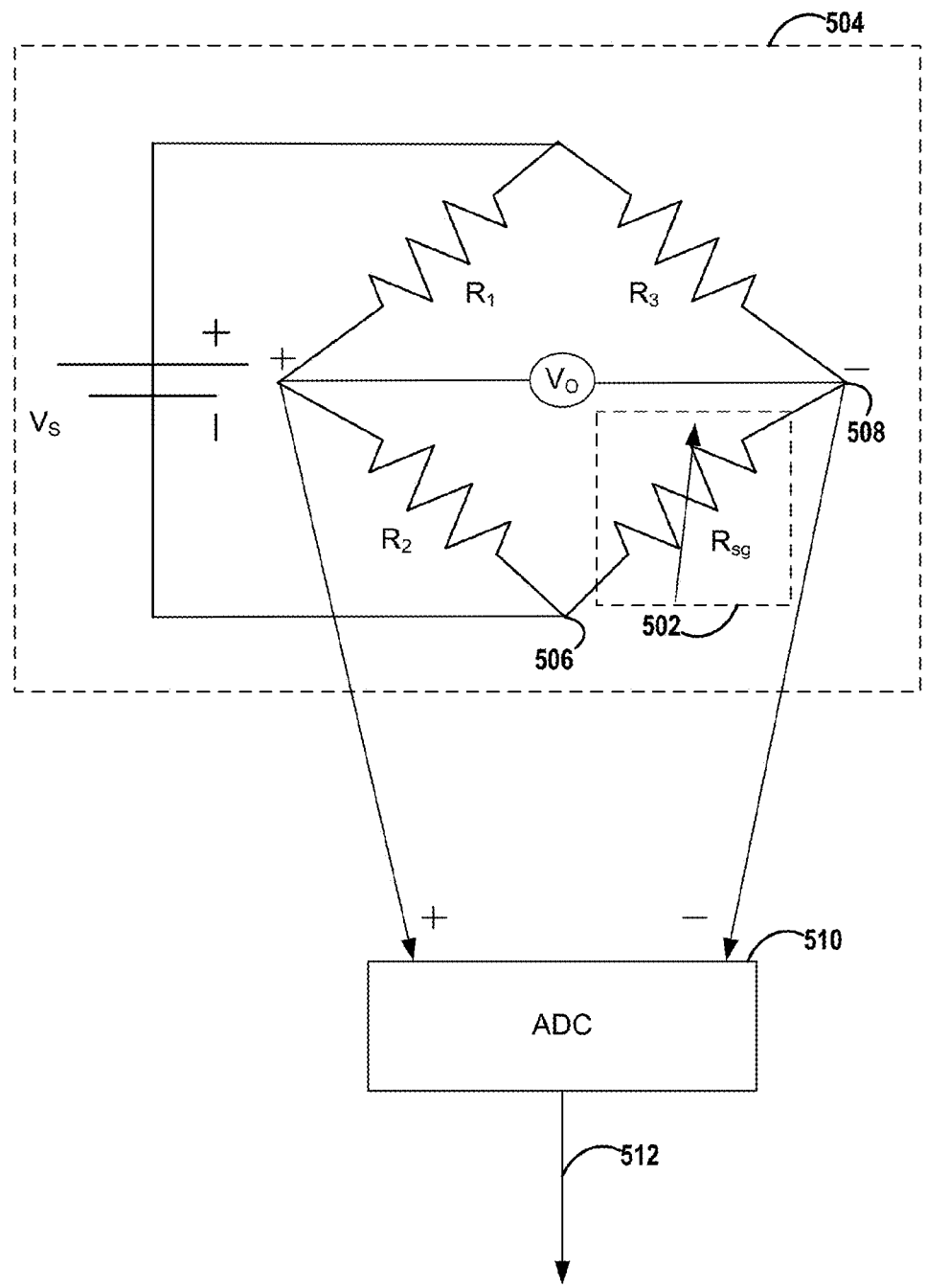
FIG. 5 is a schematic diagram of an example wearable computing device.

Referring to FIG. 5, a strain gauge 502 may be one of four resistive legs of a Wheatstone bridge 504 (e.g., a quarter-bridge configuration). In other examples, more than one resistive leg of the Wheatstone bridge may be a strain gauge (e.g., a half-bridge or full-bridge configuration). The Wheatstone bridge 504 may be configured to generate the (voltage) signal "$V_O$" that represents the strain of the frame of the wearable computing device. For example, the strain gauge 502 may include a path of conductive material with two terminals 506 and 508 located at respective ends of the path. A resistance "$R_{sg}$" between the two terminals 506 and 508 may change as the conductive path flexes, compresses, stretches, or otherwise deforms in response to forces applied to the frame of the wearable computing device. As the resistance $R_{sg}$ between the two terminals 506 and 508 of the strain gauge 502 changes in response to various forces applied to the frame of the wearable computing device, the signal $V_O$ of the Wheatstone bridge 504 may change according to equation 1:

$$V_0 = \left( \frac{R_2}{R_1 + R_2} - \frac{R_{sg}}{R_{sg} + R_3} \right) V_S \quad [1]$$

For example, as the resistance $R_{sg}$ of the strain gauge 502 increases, the (voltage) signal $V_O$ may decrease. Conversely, if the resistance $R_{sg}$ of the strain gauge 502 decreases, the (voltage) signal $V_O$ may increase.

Referring back to FIG. 3, at optional block 304 the method 300 includes generating a representation of the detected signal. As shown in FIG. 5, the signal $V_O$ may be provided to an analog-to-digital converter (ADC) 510. The ADC 510 may receive the signal $V_O$ and generate a digital representation 512 of the signal $V_O$. For example, distinct sections of a potential voltage range of the signal $V_O$ could be respectively mapped to $2^n$ distinct n-bit digital representations. In this way, the digital representation 512 of the signal $V_O$ may serve as a proxy for the strain of the frame of the wearable computing device (i.e., whether the wearable computing device is being worn).

Referring back to FIG. 3, at optional block 306 the method 300 includes comparing the representation of the signal to a threshold value. For example, a processor of the wearable computing device may determine if the digital representation 512 of the signal $V_O$ is greater than, less than, or equal to a threshold value. The threshold value may represent a digital representation of a signal indicating that the wearable computing device is or is not being worn by a user.

Figure 6:
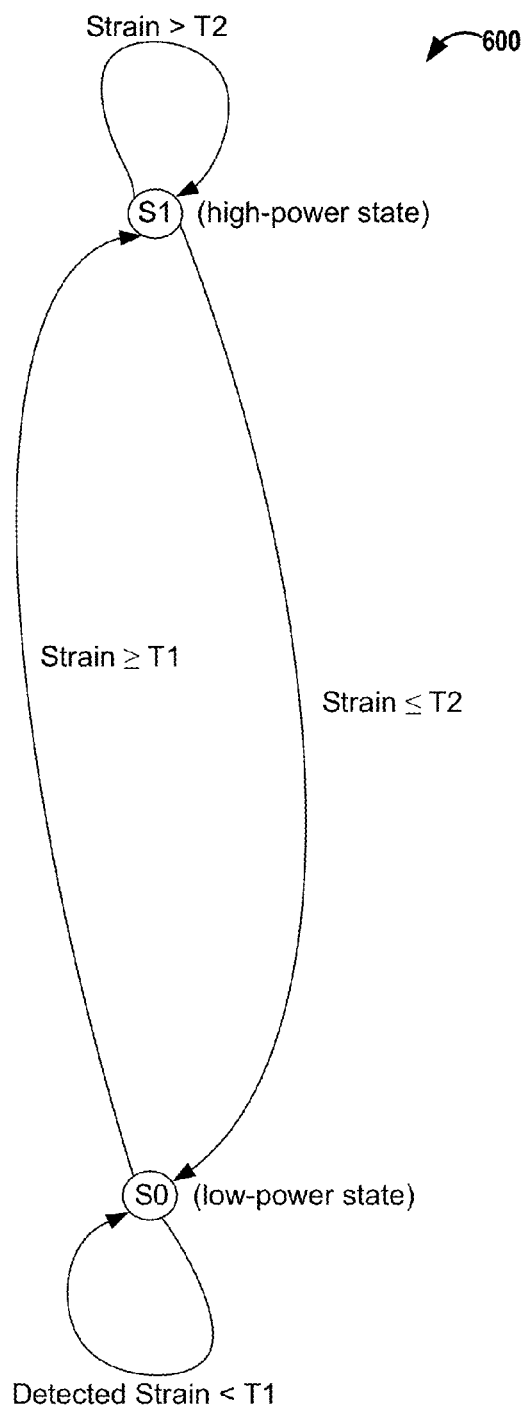
FIG. 6 is an example state transition diagram of a wearable computing device.

For example, FIG. 6 illustrates a state transition diagram 600 of a wearable computing device. The wearable computing device may be configured to operate in a low-power state S0 (e.g., a "sleep" state) and a high-power state S1 (e.g., an "active" state). For example, when operating in the low-power state S0, the wearable computing device may remain in the state S0 while a signal representing a strain less than a first threshold value T1 is detected by the wearable computing device. When the detected strain is determined to be greater than or equal to the first threshold value T1, the wearable computing device may transition into the state S1, which corresponds to a high-power state of the wearable computing device. The wearable computing device may remain in state S1 while a signal representing a strain greater than a second threshold value T2 is detected by the wearable computing device. When a signal representing a strain less than or equal to the second threshold value T2 is detected by the wearable computing device, the wearable computing device transitions back into the state S0 corresponding to a low-power state of the wearable computing device. Although, FIG. 6 depicts the wearable computing device changing power states in response to varying levels of detected strain, the wearable computing device could also perform other functions as a response to detected levels of strain, such as beginning to record video, syncing data stored on the wearable computing device with a server, etc. Other example functions are possible. It should be noted that in this example, threshold value T2 is less than or equal to threshold value T1, although threshold value T2 is preferably less than threshold value T1, which provides a non-zero range of detected strains greater than T2 and less than T1 that do not trigger state transitions. This prevents the wearable computing device from "fluttering" between power states based on small fluctuations in detected strains.

The threshold values T1 and T2 may be determined based on a reference value (e.g., T2≤Reference Value≤T1). The reference value may represent an actual steady-state strain experienced by the frame of the wearable computing device while the wearable computing device is being worn (or not being worn). The reference value may be determined in a variety of ways. For example, the wearable computing device may determine that the wearable computing device is being worn by a user and detect a strain signal generated by the strain gauge at that time. The wearable computing device may determine that the wearable computing device is being worn by (i) receiving input at a user-interface of the wearable computing device, (ii) visually detecting the presence of an eye of the user proximate to the wearable computing device (e.g., head-mounted device), (ii) receiving accelerometer data indicating that the wearable computing device is being worn, or (iv) receiving gyroscope data indicating the wearable computing device is being worn. For example, a HMD may receive tactile input at a touchpad of the HMD, use a video camera to detect a user's eye, receive accelerometer data indicating that the HMD is bouncing up and down slightly as the user walks, or receive gyroscope data indicating that the user has picked up the HMD and rotated the HMD in an angular position suitable for placement on the user's head. A wearable computing device may determine that the wearable computing device is being worn in other ways as well.

It may be beneficial to make a transition of the wearable computing device from state S0 to state S1 dependent on detection of the threshold value T1 which is greater than the reference value, to increase a confidence level of the wearable computing device actually being worn when the transition from state S0 to state S1 occurs. Likewise, it may be beneficial to make a transition of the wearable computing device from state S1 to state S0 dependent on detection of the threshold value T2 which is less than the reference value, to increase a confidence level of the wearable computing device actually being removed from a user's body when the transition from state S1 to state S0 occurs. The non-zero range of detected strain that must be traversed before a state transition occurs also makes it more likely that the wearable computing device will not "flutter" between the state S0 and S1 because of small deviations in the detected strain of the frame of the wearable computing device that occur while the wearable computing device is at rest or is being worn.

In some instances, the wearable computing device may be configured to identify a detected signal that falsely indicates that the wearable computing device is currently being worn or falsely indicates that the wearable computing device isn't being worn. At times, the user may provide to the wearable computing device tactile input representing commands. In some examples, the tactile input may be received at an interface near one or more strain gauges within the frame of the wearable computing device. The wearable computing device may recognize that the wearable computing device is currently receiving tactile input that is contributing to the detected strain signal and wait until the wearable computing device no longer detects user input to cause state transitions based on detected signals representing strain of the frame of the wearable computing device.

As another example, a confidence level pertaining to whether the detected signal correctly represents whether the wearable computing device is being worn by the user can be increased by determining a running average of the signal detected by the strain gauge. Referring to FIG. 5, the wearable computing device (e.g., a processor) may receive multiple digital representations 512 of the signal $V_O$ corresponding to multiple instances of time and determine an average value of the multiple digital representations 512. The wearable computing device may then compare the average value of the multiple digital representations 512 to a threshold value. By taking into account strains detected by the strain gauge of the wearable computing device at multiple instances of time, the wearable computing device may more accurately determine whether a user is wearing the wearable computing device by lessening an effect that potentially inaccurate outlier measurements of strain have on the state or functionality of the wearable computing device.

In another example, the wearable computing device may include two or more strain gauges. Referring to FIG. 4B, when a user is wearing a head-mounted device (HMD), a first strain gauge may be located proximately anterior to the user's ear at 422 whereas the second strain gauge may be located proximately posterior to the user's ear at 420. Depending on the shape and size of the HMD, the frame of the HMD may experience varying ranges of strain at different areas of the frame when the HMD is placed on or removed from the user's head. Therefore, a desirable placement of the strain gauges (i.e., placement at areas of the frame that experience relatively large ranges of strain) may depend on the shape and size of the wearable computing device or HMD. With regard to the HMD example depicted in FIG. 4B, the strain gauge located at 422 (in front of the user's ear) may be more optimally located than the strain gauge located at 420 (behind the user's ear). However, in other examples, a strain gauge may be more optimally placed behind the user's ear instead of in front of the user's ear.

The first strain gauge may generate a first signal representing a first strain, and the second strain gauge may generate a second signal representing a second strain. Further, one or more analog-to-digital converters (e.g., ADC 510) may generate a first digital representation of the first signal and a second digital representation of the second signal.

In such an embodiment, the wearable computing device may compare the first representation to a first threshold value and the second representation to a second threshold value. The wearable computing device may then cause the wearable computing device to perform a function (e.g., change a power state of the wearable computing device, begin recording video, etc.) based on the comparisons. For example, the wearable computing device may initially be in a low-power state when the first and second signals are detected. The wearable computing device may be configured to transition from the low-power state to the high-power state only if both the first representation of the first signal and the second representation of the second signal are determined to be less than or greater than respective threshold values indicating that the wearable computing device is being worn. A threshold value corresponding to the first strain gauge may be different from a threshold value corresponding to the second strain gauge since the strain gauges may generate signals representing different amounts of strain based on the different locations of the strain gauges within the frame of the wearable computing device.

By utilizing two strain gauges to detect strains indicating that the wearable computing device is being worn before causing a transition to the high-power state, a confidence level pertaining to the determination of whether the wearable computing device is being worn may be higher than when the determination is made based on data received from only one strain gauge. Data from two strain gauges may similarly be used to cause a transition from a high-power state to a low-power state, or to cause other functions of the wearable computing device to be performed.

Figure 4A:
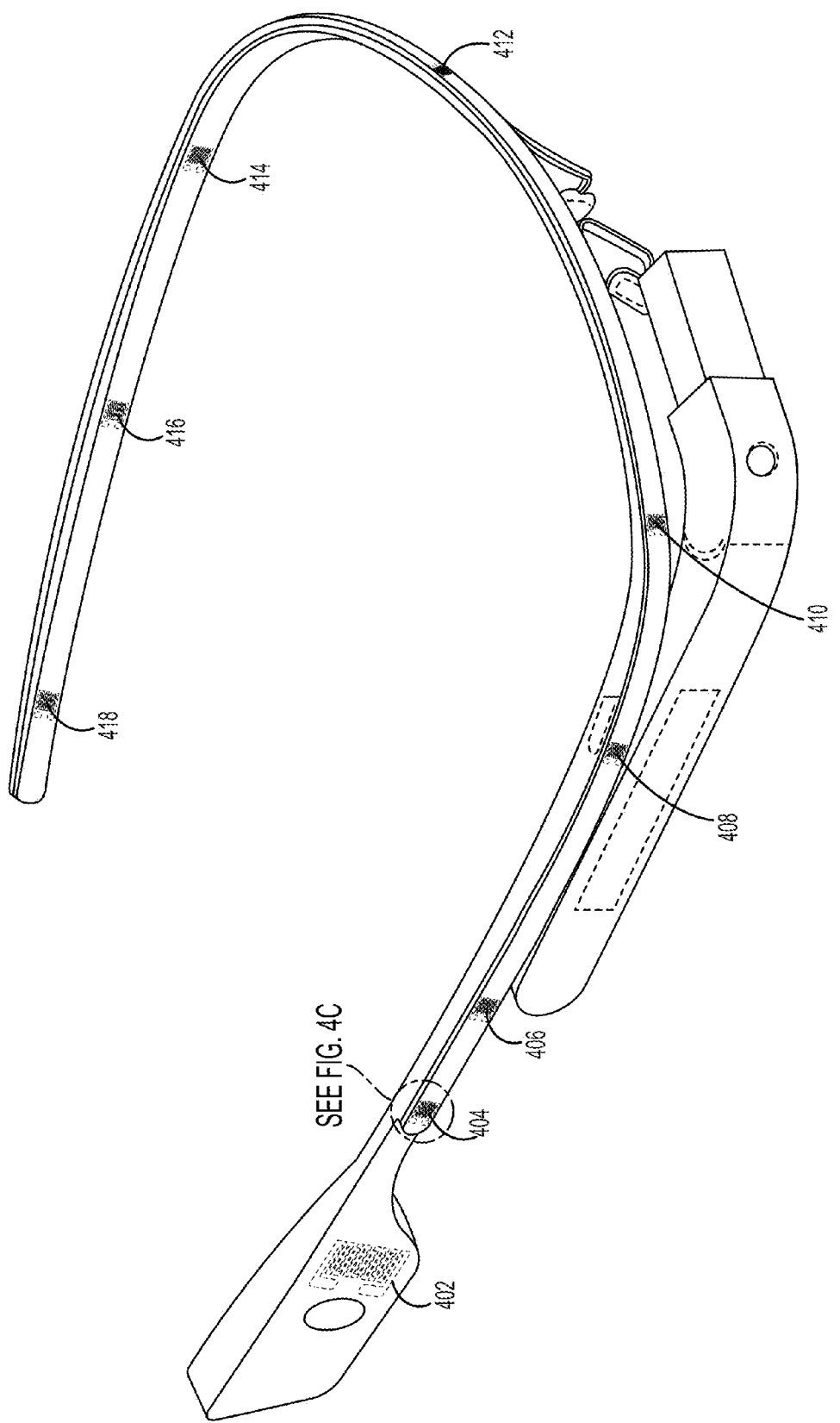
FIG. 4A illustrates example positions of strain gauges of a wearable computing device.
Figure 4B:
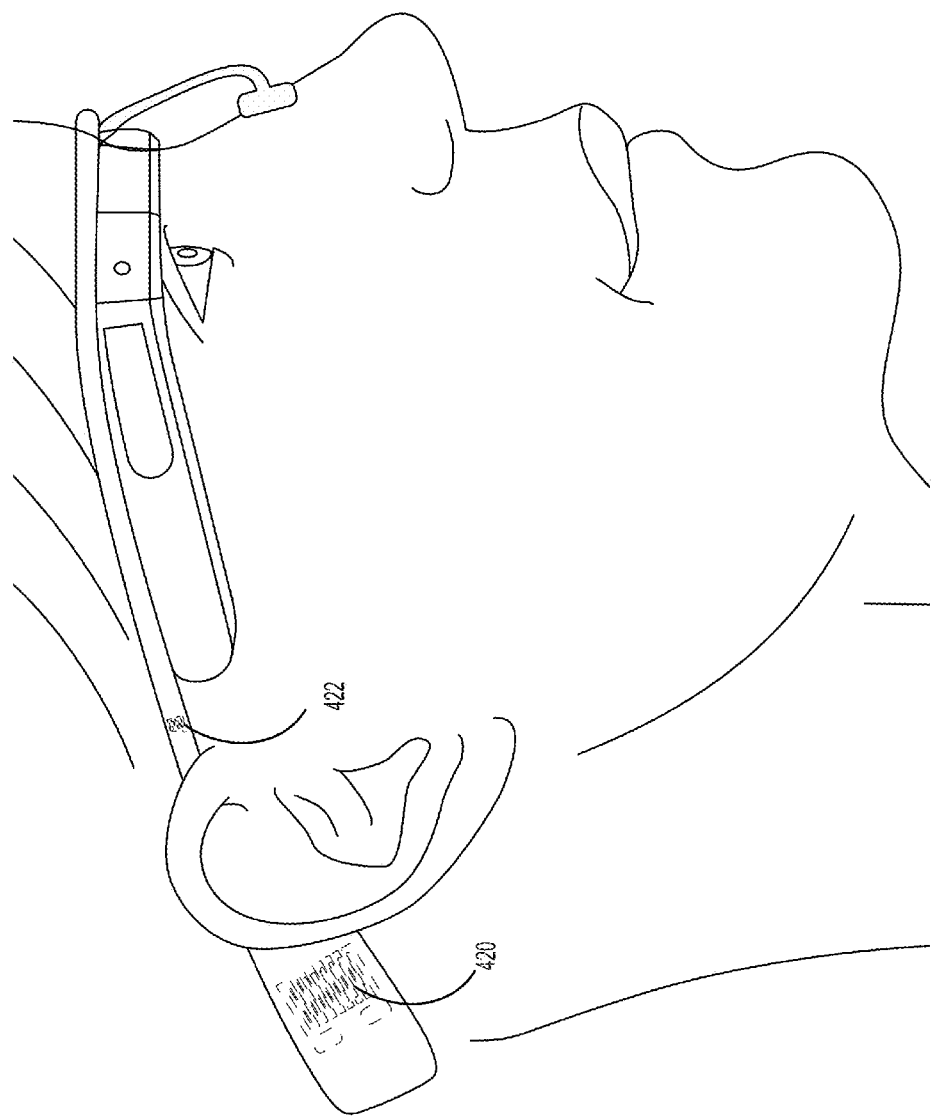
FIG. 4B illustrates example positions of strain gauges of a wearable computing device.
Figure 4C:
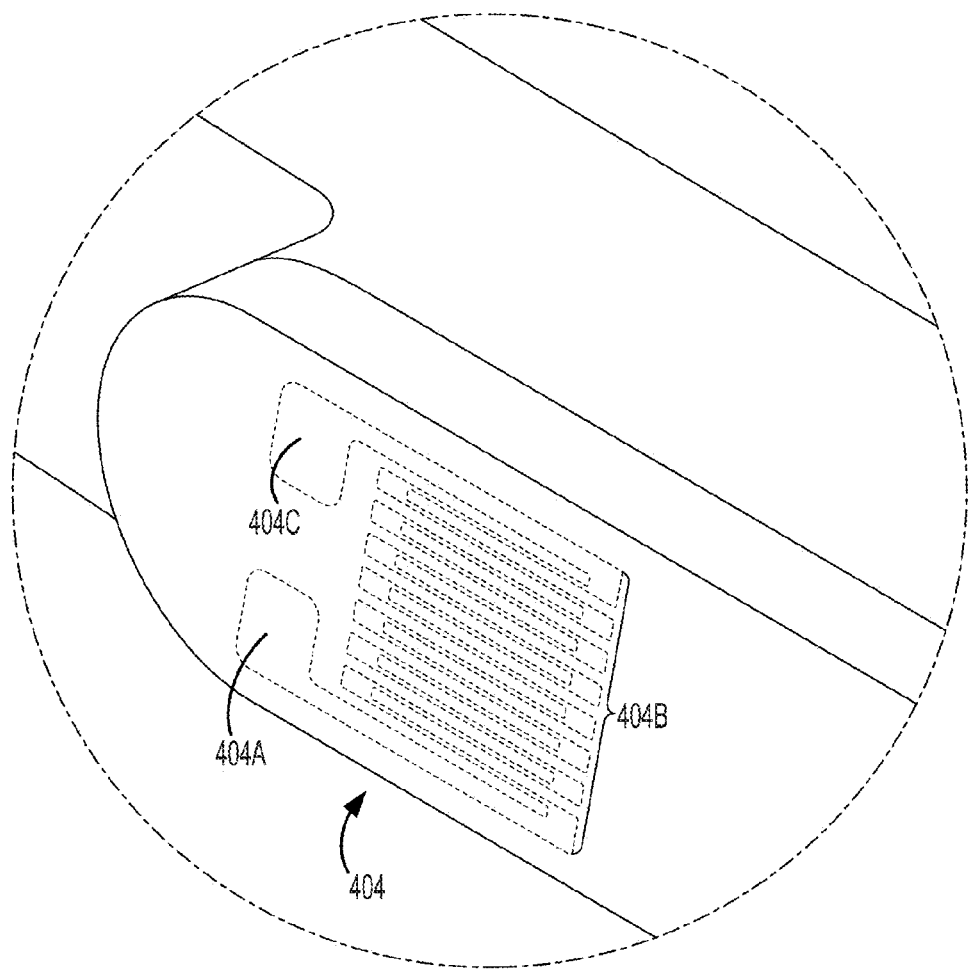
FIG. 4C is a close-up view of an example strain gauge.

FIG. 4C illustrates a close-up view of the strain gauge 404 of FIG. 4A. The strain gauge 404 includes a first terminal 404A, a conductive path 404B, and a second terminal 404C. As the conductive path 404B flexes, compresses, stretches, or otherwise deforms in response to forces applied to the frame of the HMD, a resistance between the first terminal 404A and the second terminal 404C may change. The HMD may detect the resistance between the first terminal 404A and the second terminal 404C to determine whether the HMD is being worn by a user.

Referring back to FIG. 3, at block 308, the method 300 includes causing the wearable computing device to perform a function based on the detected signal. One function that the wearable computing device may perform based on the detected signal is to change states (e.g., toggle between high-power and low-power states). For example, the wearable computing device may change from a low-power state to a high-power state if the detected signal represents a strain of the frame of the wearable computing device that indicates that the wearable computing device is being worn. Also, the wearable computing device may change from a high-power state to a low-power state if the detected signal represents a strain of the frame of the wearable computing device that indicates that the wearable computing device is no longer being worn. Other functions that the wearable computing device may perform based on the detected signal could include enabling the display of message notifications in a heads-up display, resuming or starting recording of video by a video camera of the wearable computing device, or enabling display of video frames in the heads-up display. Other functions could be performed based on the detected signal as well.

For example, a high-power state may be defined by having many features of the wearable computing device enabled, such as receiving and displaying real-time notifications, engaging in video calls or phone calls, and capturing ambient video and audio, to name a few. In a low-power state, the wearable computing device may continue to sync data such as email and text messages, and be available to receive phone or video calls, but a display of the wearable computing device may be powered of or disabled. When transitioning from a low-power state to a high-power state, the wearable computing device may display a "lock screen" that prompts an input of an unlock code or a PIN to enable further access to the HMD. In other embodiments, as the wearable computing device transitions from the low-power state to the high-power state, the wearable computing device may display a home screen or provide the same display that was being displayed as the wearable computing device last transitioned to the low-power state.

It should also be noted that terms such as "high-power state" and "low-power state" are used as examples only and should not be interpreted as limiting. For example, the terms "high-power state" and "low-power state" are not confined to any particular range of power consumption by the wearable computing device. Rather, in a high-power state the wearable computing device may generally consume more power than when in a low-power state because while in the high-power state the wearable computing device may perform more power-consuming functions.

Further, the wearable computing device may be configured to operate in several power states, with each power state characterized by varying levels of power consumption and/or functionality. For example, entering one power mode may disable functions that include the wearable computing device communicating with other computing devices but may enable any functionality that does not require communication with other computing devices. Another power mode may disable all capture of ambient video or audio while allowing the wearable computing device to communicate with another computing device to receive text notifications and/or video or phone calls.

Also, the wearable computing device may be configured to sequentially enable various functionalities of the wearable computing device as the wearable computing device detects that the wearable computing device has been worn continuously for increasing amounts of time. In one example, the wearable computing device may be in a low-power state. While in the low-power state, the wearable computing device may be configured to detect strain gauge signals representing whether the wearable computing device is being worn by a user, but all other functionality may be disabled. Then, if the wearable computing device detects one or more strain signals indicating that the wearable computing device has been worn continuously for a first threshold duration (e.g. for at least one second), the wearable computing device may transition to an intermediate-power mode that enables syncing of email, text messages, and voicemails, and allows the wearable computing device to display notifications of any new messages received during the sync. Next, if the wearable computing device detects one or more strain signals indicating that the wearable computing device has been worn continuously for a second threshold duration (e.g., for at least five seconds, or four seconds since the wearable computing device transitioned from the low-power state to the intermediate-power state), the wearable computing device may enter a high-power state that enables full functionality of the wearable computing device, such as video capture, display of real-time notifications pertaining to a user's surroundings and any other function the wearable computing device may be configured to perform. This may allow a HMD to briefly sync messages when placed on the user's head, then quickly re-enter a "sleep" state when removed, without unnecessarily consuming power performing functions that are not needed during the brief time that messages are synced.

IV. CONCLUSION

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

We claim:

1. A method performed by a wearable computing device (WCD), the method comprising:
    detecting a first amount of force applied to a frame of the WCD while the WCD is being worn;
    determining that the WCD is being worn while the first amount of force is applied to the frame based on one or more of (i) receiving an input from a user interface of the WCD, (ii) detecting the presence of an eye of a wearer of the WCD, or (iii) receiving, from an accelerometer or a gyroscope of the WCD, data indicating that the WCD is being worn;
    using the detected first amount of force to establish a range of force that corresponds to the WCD being worn;
    after establishing the range of force, detecting a second amount of force applied to the frame;
    comparing the detected second amount of force with the established range of force to determine that the detected second amount of force indicates that the WCD is being worn; and
    in response to determining that the detected second amount of force indicates that the WCD is being worn, transitioning the WCD from a first state to a second state.

2. The method of claim 1,
    wherein the first state is a low-power state and the second state is a high-power state, and
    wherein transitioning from the low-power state to the high-power state comprises displaying a lock screen in a display of the WCD.

3. The method of claim 1,
    wherein the first state is a low-power state and the second state is a high-power state, and
    wherein transitioning from the low-power state to the high-power state comprises displaying a home screen in a display of the WCD.

4. The method of claim 1, wherein detecting the second amount of force comprises detecting an amount of force greater than or equal to the second amount of force for at least a first threshold amount of time.

5. The method of claim 4, further comprising:
    detecting an amount of force greater than or equal to the second amount of force for at least a second threshold amount of time that is greater than the first threshold amount of time; and
    based on detecting the amount of force greater than or equal to the second force for at least the second threshold amount of time, transitioning the WCD from the second state to a third state.

6. The method of claim 1, wherein determining that the WCD is being worn while the first amount of force is applied to the frame comprises determining that the WCD is being worn based on receiving the input from the user-interface of the WCD.

7. The method of claim 1, wherein determining that the WCD is being worn while the first amount of force is applied to the frame comprises determining that the WCD is being worn based on detecting the presence of the eye of the wearer.

8. The method of claim 1, wherein determining that the WCD is being worn while the first amount of force is applied to the frame comprises determining that the WCD is being worn based on receiving data from the accelerometer of the WCD indicating that the WCD is being worn.

9. The method of claim 1, further comprising:
    receiving tactile input via the user-interface of the WCD;
    detecting a third amount of force applied to the frame;
    determining that the third amount of force, at least in part, represents a force applied to the frame via the received tactile input; and
    refraining from changing a state of the WCD at least until determining that the WCD is no longer receiving the tactile input.

10. The method of claim 1, further comprising:
    detecting a third amount of force applied to the frame;
    based on a comparison of the established range of force and the detected third amount force, determining that the detected third amount of force indicates that the WCD is not being worn; and
    in response to determining that the detected third amount of force indicates that the WCD is not being worn, transitioning the WCD from the second state to the first state.

11. The method of claim 1, wherein determining that the WCD is being worn while the first amount of force is applied to the frame comprises determining that the WCD is being worn based on receiving data from the gyroscope of the WCD indicating that the WCD is being worn.

12. A non-transitory computer readable medium storing instructions that, when executed by a wearable computing device (WCD), cause the WCD to perform functions comprising:
    detecting a first amount of force applied to a frame of the WCD while the WCD is being worn;

determining that the WCD is being worn while the first amount of force is applied to the frame based on one or more of (i) receiving an input from a user interface of the WCD, (ii) detecting the presence of an eye of a wearer of the WCD, or (iii) receiving, from an accelerometer or a gyroscope of the WCD, data indicating that the WCD is being worn;

using the detected first amount of force to establish a range of force that corresponds to the WCD being worn;

after establishing the range of force, detecting a second amount of force applied to the frame;

comparing the detected second amount of force with the established range of force to determine that the detected second amount of force indicates that the WCD is being worn; and in response to determining that the detected second amount of force indicates that the WCD is being worn, transitioning the WCD from a first state to a second state.

13. The non-transitory computer readable medium of claim 12, wherein detecting the second amount of force comprises detecting an amount of force greater than or equal to the second amount of force for at least a threshold amount of time.

14. The non-transitory computer readable medium of claim 12, wherein determining that the WCD is being worn while the first amount of force is applied to the frame comprises determining that the WCD is being worn based on receiving data from the accelerometer indicating that the WCD is being worn.

15. The non-transitory computer readable medium of claim 12, wherein determining that the WCD is being worn while the first amount of force is applied to the frame comprises determining that the WCD is being worn based on receiving data from the gyroscope indicating that the WCD is being worn.

16. A wearable computing device (WCD) comprising:
a frame;
a processor;
one or more of a user interface, an eye detection system, an accelerometer, or a gyroscope;
a strain gauge affixed to the frame; and
a computer readable medium storing instructions that, when executed by the processor, cause the WCD to perform functions comprising:

detecting, via the strain gauge, a first amount of force applied to the frame while the WCD is being worn;

determining that the WCD is being worn while the first amount of force is applied to the frame based on one or more of (i) receiving an input from the user interface, (ii) detecting, via the eye detection system, the presence of an eye of a wearer of the WCD, or (iii) receiving, from the accelerometer or the gyroscope, data indicating that the WCD is being worn;

using the detected first amount of force to establish a range of force that corresponds to the WCD being worn;

after establishing the range of force, detecting, via the strain gauge, a second amount of force applied to the frame;

comparing the detected second amount of force with the established range of force to determine that the detected second amount of force indicates that the WCD is being worn; and in response to determining that the detected second amount of force indicates that the WCD is being worn, transitioning the WCD from a first state to a second state.

17. The WCD of claim 16, wherein determining that the WCD is being worn while the first amount of force is applied to the frame comprises determining that the WCD is being worn based on receiving the input from the user-interface.

18. The WCD of claim 16, wherein determining that the WCD is being worn while the first amount of force is applied to the frame comprises determining that the WCD is being worn based on detecting the presence of the eye of the wearer.

19. The WCD of claim 16, wherein determining that the WCD is being worn while the first amount of force is applied to the frame comprises determining that the WCD is being worn based on receiving data from the accelerometer indicating that the WCD is being worn.

20. The WCD of claim 16, wherein determining that the WCD is being worn while the first amount of force is applied to the frame comprises determining that the WCD is being worn based on receiving data from the gyroscope indicating that the WCD is being worn.

* * * * *